A. G. KOLLSTEDE.
PRESSURE CORRECTING METER.
APPLICATION FILED DEC. 30, 1912.

1,230,583.

Patented June 19, 1917.
3 SHEETS—SHEET 1.

WITNESSES

INVENTOR
Alfred G. Kollstede
BY
ATTORNEY

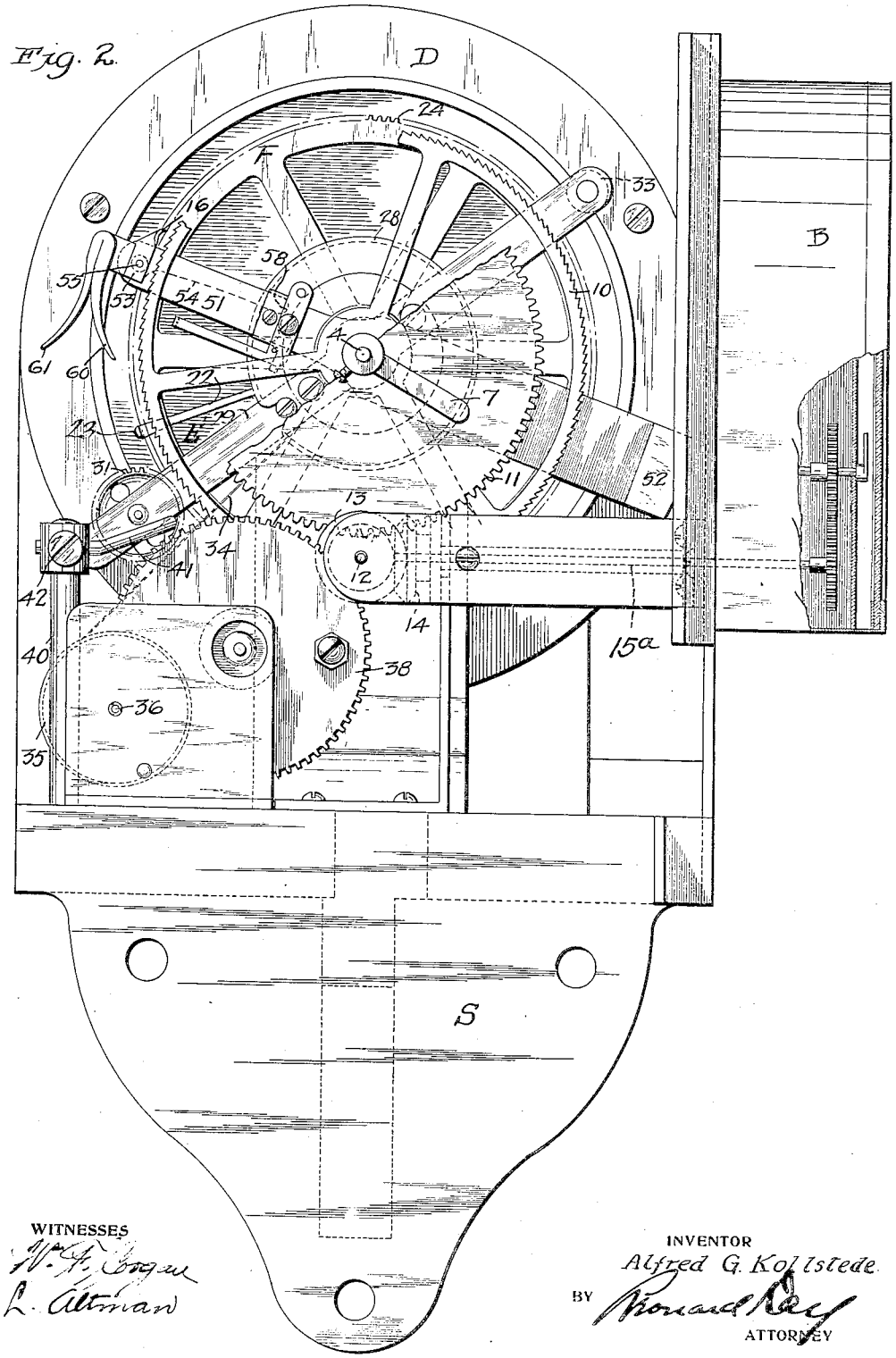

A. G. KOLLSTEDE.
PRESSURE CORRECTING METER.
APPLICATION FILED DEC. 30, 1912.

1,230,583.

Patented June 19, 1917.
3 SHEETS—SHEET 3.

WITNESSES

INVENTOR
Alfred G. Kollstede
BY
ATTORNEY

UNITED STATES PATENT OFFICE.

ALFRED G. KOLLSTEDE, OF NEW YORK, N. Y., ASSIGNOR TO ROTARY METER COMPANY, A CORPORATION OF NEW YORK.

PRESSURE-CORRECTING METER.

1,230,583.  Specification of Letters Patent.  Patented June 19, 1917.

Application filed December 30, 1912. Serial No. 739,187.

*To all whom it may concern:*

Be it known that I, ALFRED G. KOLLSTEDE, a citizen of the United States, and a resident of the borough of Manhattan, county, city, and State of New York, have invented certain new and useful Improvements in Pressure-Correcting Meters, set forth in the following specification.

This invention relates to meters for measuring the flow of gaseous fluids. The majority of meters which measure the flow of gaseous fluid register merely the volume-flow without regard to the actual mass-flow. For many purposes it is important at least to approximate a measurement of the mass-flow of a gas. One of the principal influencing factors upon the mass of a gas is the pressure to which it is subjected. For instance in the case of illuminating gas over four times as much gas measured by mass will flow through a meter at fifty pounds' pressure than at atmospheric pressure.

The object of the present invention is to correct for variations in the pressure of a gas, the fundamental measurement of which is by volume. To this end the invention contemplates novel means singly and in combination with a volume-measurer for gas and an index for designating the total flow, all as will be set forth more particularly in the following specification by way of illustration, which should be read in connection with the illustrative embodiments shown in the accompanying drawings, which form a part hereof, in which like characters designate corresponding parts, and in which,—

Fig. 2 is a view with parts broken away looking toward the right of Fig. 1;

A designates a volume-flow-meter of standard construction such as the rotary meter; B indicates an index of suitable standard construction; while C indicates collectively various means for correcting upon the index B the operation of the volume-meter A in accordance with variations in pressure.

The mechanism C itself comprises several distinct parts, D a pressure-gage, E a pressure-finder, and F mechanism controlled by the pressure-finder for driving the index B subject to the pressure correction.

Figure 5:
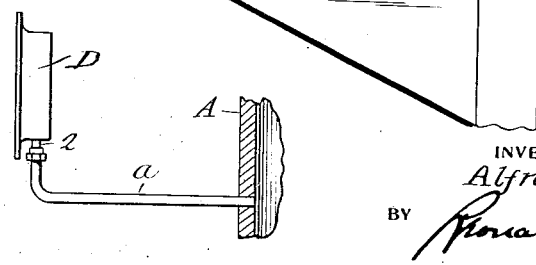
Fig. 5 is a diagram indicating the fluid pressure connection between the meter A and the pressure gage D through the medium of a duct *a*.
Figure 4:
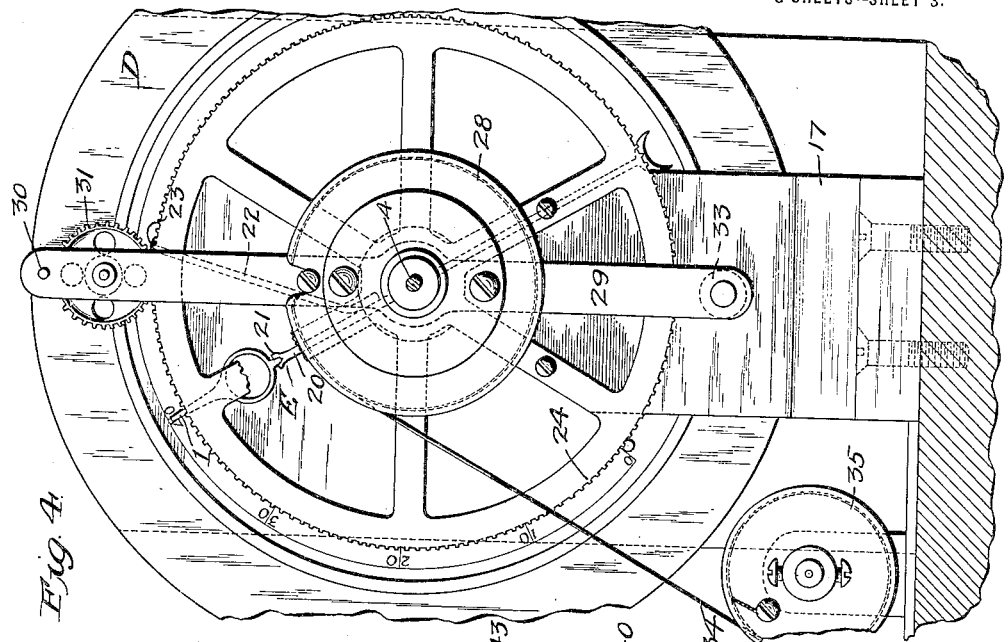
Fig. 4 is a detail view with parts broken away through line III—III of Fig. 1, but looking in the opposite direction from the showing in Fig. 3.
Figure 3:
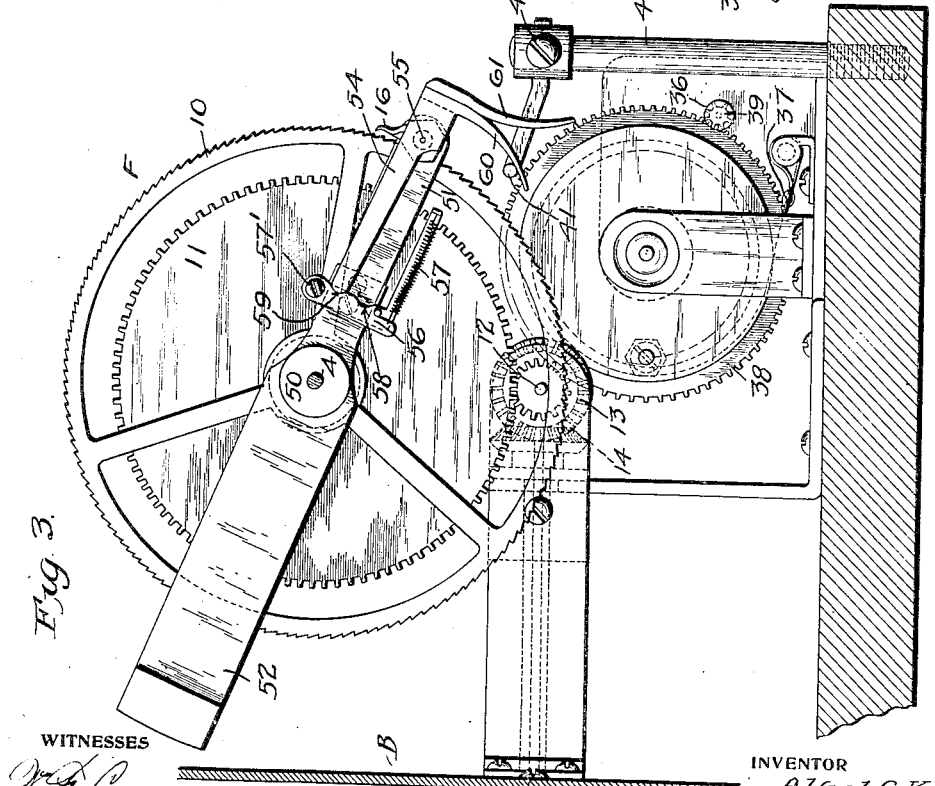
Fig. 3 is a detail view through the plane of line III—III of Fig. 1, looking in the direction of the arrows.

The pressure-gage D may be of any suitable construction and is shown in the form of a standard Bourdon gage, the pointer of which is indicated by 1 and the pressure-coupling 2 of which in practice is connected with the interior of the volume-meter A in a manner to be subject to the variations in pressure within the meter A, as by the duct *a* shown in the diagram of Fig. 5.

In the construction shown, 3 is what is known as the one-hundred foot shaft of the meter A. One rotation of this shaft through the medium of a reduction gear driven by the usual impulse vane indicates the passage through the meter A of one hundred cubic feet of gas. In the mechanism illustrated this shaft 3 is terminated within the casing of the meter A and a second axially alined shaft 4 is continued out through the casing of meter A through the stuffing-box 5. The torque of the shaft 3 is imparted to the shaft 4 through the medium of any suitable clutch mechanism, such as the pin and tongue 6, 7 which will permit irregularities in the alinement of the two shafts 3 and 4.

A shouldered bearing 8 is fixed to the shaft 4 to form a bearing for the hub 9 to which hub are secured rigidly the wheel 10 and the gear-wheel 11. The gear-wheel 11 is geared to drive the index B through the medium of the shaft 12, gears 13 and 14, suitably mounted and the index shaft 15ª. From the construction just described, it should be clear that the ratchet wheel 10, hub 9 and gear 11 rotate as a unit independently of the drive-shaft 4 and are driven through the medium of the pawl 16 in a manner presently to be described and under the control of the pressure finder E.

Figure 1:
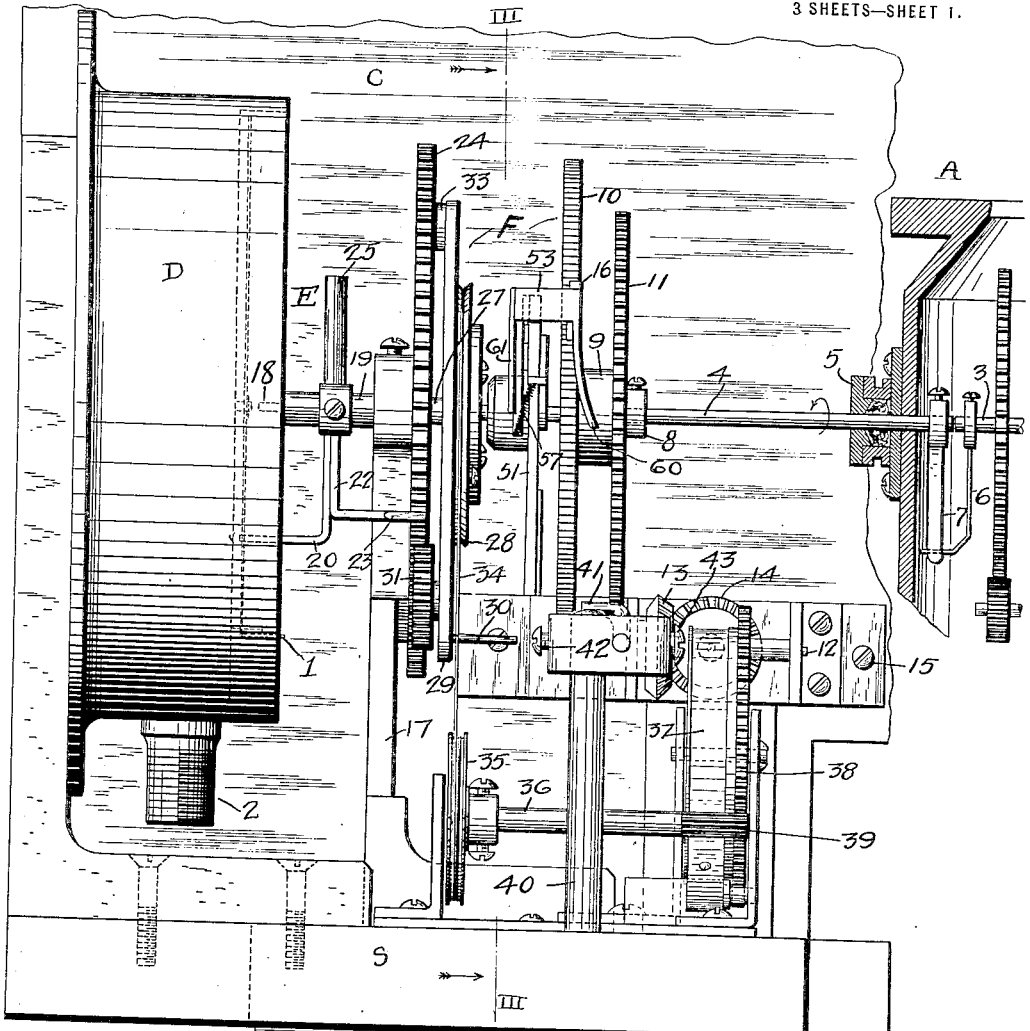
Figure 1 is a semi-diagrammatic side elevation partly in section and showing the invention.

The upright 17 supported by the base S mounts a spindle 18 axially alined with the spindle of the pressure-gage finger 1. Upon one end of this spindle 18 the hub 19 turns freely and has mounted upon it the right angle arm 20 which terminates in a fork 21 embracing the finger 1. Angularly spaced apart in a clockwise direction from the member 20, when viewed from the right in Fig. 1 is a second arm 22 fixed to the hub 19 and offset at its end and flattened into a spring-clog 23 to overlie the periphery of a rack-gear 24 which is concentric with the spindle 18 but is fixed to the upright 17. The members 20 and 22 are balanced upon the spindle 18 by the counter-poise 25 so that this pressure finder offers no retarding effect upon the free movement of the pressure indicating finger 1 of the pressure-gage D. Through the medium of the bearing 27, the sheave 28 and the spider 29 are carried rotatably by the spindle 18. The spider 29 is shown in the form of a double radius bar one end of which is provided with a cam striker 30 and which at the same end carries the loosely journaled planet-pinion 31 rolling in mesh with the rack-gear 24, which serves as a guide-way against which the spider 29 holds the rotatable member 31 in rolling contact. The opposite end of the spider 29 is provided with a counter-weight 33 balancing the same about the spindle 18. The sheave 28 has secured to it a cord 34 leading to the winding-drum 35 fixed to the shaft 36 suitably mounted and exerting a winding torque upon the drum 35 through the medium of the spring 37 which operates through the gear 38 and pinion 39.

The post 40 mounted on the base S provides a suitable support for the adjustable cam striker 41 which may be adjusted vertically, longitudinally and universally through the medium of the screws 42 and 43.

To the end of the drive shaft 4 is fixed a hub 50 which carries a radius arm 51 for mounting the pawl 10 and its cam mechanism and which is counter-weighted and balanced by the diametrically opposite bar 52. The pawl 16 overlies the ratchet wheel 10 and through the medium of the lip 53 is secured to the latching lever 54 pivoted to the radius arm 51 by the pivot pin 55. The latch 56 pivoted by the screw 57' to an offset on the radius arm 51, is drawn by the spring 57 against the end of the latching arm 54, the end of the latching arm 54 having snapping engagement with the pockets 58 and 59, which pockets serve to hold the pawl 16 respectively in and out of engagement with the ratchet wheel 10. The movement of the latching arm 54 of the pawl 16 into and out of engagement with the ratchet wheel is effected by the cams 60 and 61. The cam 60 is operated by the cam striker 41 and the cam 61 by the cam striker 30 the strikers lying respectively in the offset paths of travel of the cams.

*Operation.*

Shaft 4 is driven commensurately with the volume-flow of gas in accordance with the operation of volume-meter A. The pawl 16 likewise revolves in the same manner commensurately with the operation of the volume-meter. Once every revolution of the pawl 16 a movement of the index B is effected so as to indicate, in accordance with the predetermined unit scale of the index, the volume-flow of gas corrected to atmospheric pressure. When the cam 60 reaches the cam-striker 41 in the revolution of the radius arm 51, the pawl 16 is thrown into engagement with the ratchet wheel 10 so as to carry the same around with it a fraction of a rotation predetermined by the pressure finder E. The pawl is kept in engagement with the ratchet wheel 10 by the latch 56 until it is positively released. The cam 61 engages the cam striker 30 as to revolve the spider 29 against the pull of the cord 34, which is insufficient to interfere with the operation of the meter. This rotation of the spider 29 continues until the planet-gear 31 is obstructed or clogged by the flattened finger 23 lying between the gear-teeth of the fixed rack-gear 24 and the meshing teeth of the planet-gear 31. At this instant the cam striker 30 is fixed against further yielding and is caused to snap the pawl 16 out of engagement with the ratchet-wheel 10. This determines a cessation, for this rotation of the drive shaft 4, of the operation of the index B. The cord 34 now returns the spider 29 to its normal position shown approximately in Fig. 1. Succeeding rotations of the drive shaft 4 repeat this operation, the only variation being the amount of rotation given to the ratchet wheel 10 by the pawl 16 which is determined by the position of the pressure-gage finger 1 through the medium of the pressure-finder E which moves without resistance or floats freely with it. The index B is so formed and set that one rotation of the shaft 4 will register 100 cubic feet when the pressure-gage D indicates atmospheric pressure. Adjustment of the correcting mechanism may be effected by adjusting the cam striker 41. In practice the bracket-shaped base S is bolted to the side of the volume-meter-casing.

What is claimed and what is desired to be secured by United States Letters Patent is:—

1. In a pressure-correcting meter for measuring the flow of gas, a shaft; means for rotating said shaft commensurately with the volume-flow of a gas; an index; clutch-mechanism for operatively connecting said index with said shaft throughout a fraction of each unit of rotation of said shaft; a pressure-gage for said gas comprising a finder movable throughout a limited range to mark by its relative position a predetermined pressure; and means controlled by said finder for determining the amount of said fraction of each unit of rotation of said shaft throughout which fraction said index is driven by said shaft.

2. In a pressure-correcting meter for measuring the flow of gas, a shaft; means for rotating said shaft commensurately with the volume-flow of a gas; an index; clutch-mechanism for operatively connecting said index with said shaft at the beginning of each unit of rotation of said shaft; a pressure gage for said gas comprising a finder movable throughout a limited range to mark by its relative position a predetermined pressure; and means controlled by said finder for releasing said clutch-mechanism.

3. In a pressure-correcting meter for measuring the flow of gas, a shaft; means for rotating said shaft commensurately with the volume-flow of a gas; an index; clutch-mechanism for operatively connecting said index with said shaft at the beginning of each unit of rotation of said shaft; a pressure gage for said gas comprising a finder movable throughout a limited range to mark by its relative position a predetermined pressure; and means controlled by said finder for releasing said clutch-mechanism, said means comprising a stationary rack-gear, a planet-gear in mesh therewith and a clog moved over the periphery of said rack-gear by said finder.

4. In a pressure-correcting meter for measuring the flow of gas, a rotatable pressure-finder; a rack-gear; a planet-gear linked to rotate and revolve in mesh with said rack-gear; and a clog revolved co-axially about said rack-gear by said finder; and means connected with said planet-gear for controlling the operation of an index.

5. Means for controlling the movement of a first part in accordance with the position of a movable second part which is responsive in position to very slight force comprising a guide-way; a rotatable member in rolling contact with said guide-way; means for connecting said first part with said rotatable member to interrelate the movement of said first part with the relative rolling between said rotatable member and said guide-way; and a clog for said rotatable member freely movable along said guide-way by said second part.

6. Means for controlling the movement of a first part in accordance with the position of a movable second part which is responsive in position to very slight force comprising a guide-way; a rotatable member in rolling contact with said guide-way; means for holding said rotatable member in rolling contact with said guide-way; means for connecting said first part with said rotatable member to interrelate the movement of said first part with the relative rolling between said rotatable member and said guide-way; and a clog for said rotatable member freely movable along said guide-way by said second part.

7. A pressure compensating meter for measuring the flow of gas comprising, a shaft rotated by the flow of gas; a normally inactive index; and means for dividing each period of operation of said index corresponding to one rotation of said shaft into a period of rest and a period of registering action comprising means for connecting said index with said shaft at a predeterminable angular position in each revolution and a pressure finder for disconnecting said index from said shaft at a second angular position variable in accordance with gas-pressure.

In witness whereof, I have signed my name to this specification, in the presence of two subscribing witnesses.

ALFRED G. KOLLSTEDE.

Witnesses:
 WM. J. SCHWEIGER,
 EVERETT J. PECK.